Oct. 4, 1932.   O. KREMMLING   1,881,364
APPARATUS FOR THE MECHANICAL KNEADING OF DOUGH
Filed Dec. 30, 1930   2 Sheets-Sheet 1
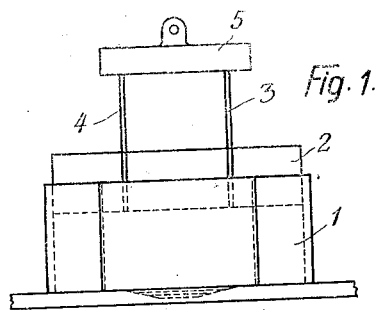
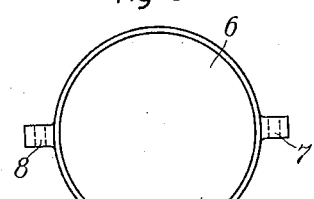
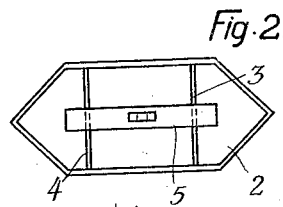
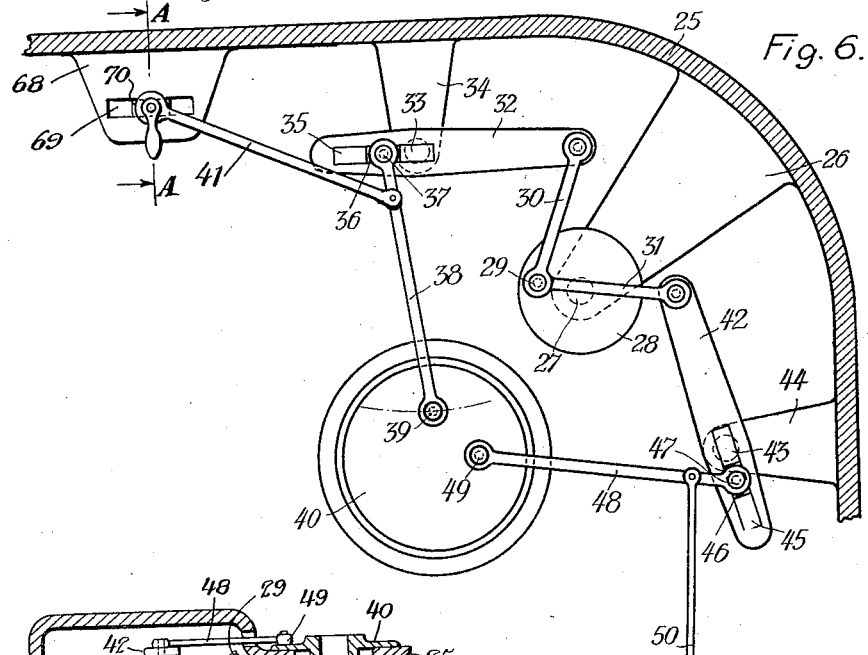
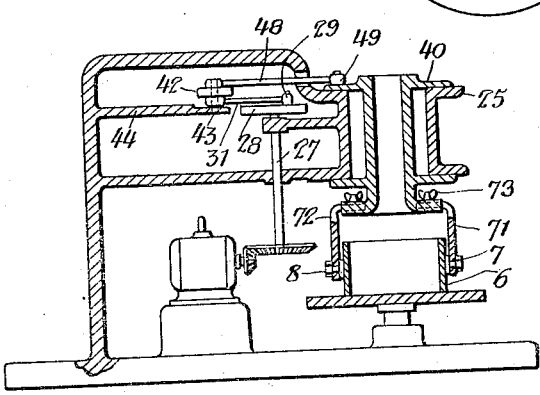
Inventor:
Otto Kremmling
By
Attorney

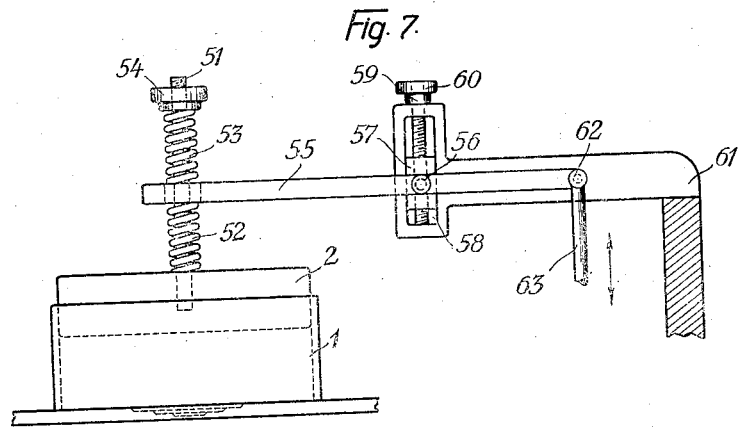
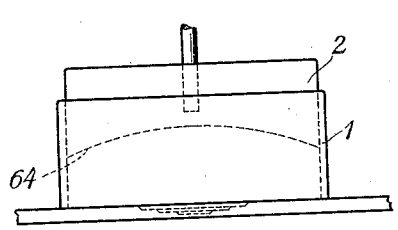
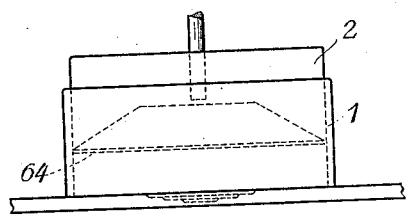
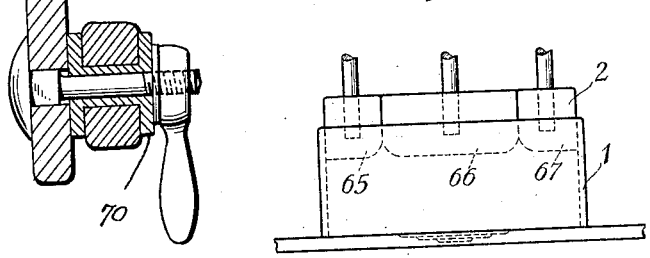

Patented Oct. 4, 1932

1,881,364

UNITED STATES PATENT OFFICE

OTTO KREMMLING, OF HAMERSLEBEN, DISTRICT OSCHERSLEBEN, GERMANY, ASSIGNOR TO LIESELOTTE KREMMLING, OF HAMERSLEBEN NEAR OSCHERSLEBEN, GERMANY

APPARATUS FOR THE MECHANICAL KNEADING OF DOUGH

Application filed December 30, 1930, Serial No. 505,617, and in Germany October 26, 1929.

This invention relates to the mechanical kneading of dough by the method which consists in confining a piece of dough in a cell having vertical walls but no bottom and reciprocating the cell over a horizontal surface which supports the dough.

It is the object of the present invention to provide improved methods of and means for kneading dough in this manner for the production of elongated work-pieces, as described in my Letters Patent 1,761,399, dated June 3rd, 1930.

According to the present invention the lateral pressure exerted by the walls of the kneading cells on the pieces of dough is varied during the movements of the cells which produce the elongation of the pieces of dough.

This variation may be effected by varying the amplitude of the reciprocatory movement in the lateral direction, or by varying the shape or volume (or both) of the kneading cells, for example by making the kneading cells of yielding material such as rubber, thin sheet metal or the like which, during the preliminary kneading retain their usual shape, and during the elongating kneading are brought mechanically into an elongated shape. Alternatively, however, displaceable partition walls are arranged within the elongated kneading cells which, during the rounding operation subdivide the long cells, but during the elongating kneading are withdrawn from the cells. The walls of the cells could be connected so as to telescope within each other parallel to the plane of kneading, or be hinged together so that their spacing can be regulated. Moreover, the alteration in pressure can also be produced by replacing the kneading cell employed during rotary kneading by an elongated kneading cell during the longitudinal kneading.

The alterations in pressure could finally also be produced by increasing or reducing the speed of the kneading movements.

Each of the two movements of which the total movement is compounded can be reduced entirely or partially to zero. Conveniently, this alteration of the individual movements is capable of being regulated during the kneading.

Further, also during the elongating kneading the pressure from above exerted on the pieces of dough may be altered or wholly or partly removed during a part of the longitudinal kneading movements.

Conveniently, the inner side of the upper wall of the kneading cell is formed corresponding to the shape of the finished pieces and is suited to these, so that by way of example in the case of longitudinally stretched pieces pointed at the ends a uniform pressure is exerted on the piece.

For the same purpose the upper wall of the kneading cell may consist of yielding material.

Finally, the upper wall of the kneading cell may consist of a number of parts which, according to the shape of the pieces, are pressed more or less deeply on the pieces during kneading. The result is obtained that, by way of example, when kneading the pointed rolls the pointed parts of the pieces which are deeper than the upper wall of the kneading cell remain in contact with the upper wall of the cell and become kneaded.

Conveniently, the longitudinal thrust movements are reduced at the end of the kneading in order completely to close in the end parts and to cause the pieces to come to rest with the "closings" underneath.

A number of constructional examples of the apparatus according to the invention are illustrated in the drawings.

Figures 1 and 2 show in side elevation an end and plan from above, an elongated kneading cell with displaceable partition walls;

Figure 3 a circular kneading cell with two ears for connecting the mechanism which alters the shape of the kneading cell after the commencement of the longitudinal kneading;

Figure 4 the same cell after the initiation of the longitudinal kneading;

Fig. 5 is a partial sectional view of an actuating mechanism which can be adjusted to perform different kneading movements;

Fig. 6 is a plan view with the top removed of the actuating mechanism shown in Fig. 5;

Fig. 6a is a cross sectional view on the line A—A of Fig. 6;

Figures 7–10 show modified kneading cells.

According to Figures 1 and 2 the kneading cell consists of an elongated hexagonal or similar structure 1 with an upper pressure plate 2, which cell is subdivided by displaceable intermediate walls 3, 4. The intermediate walls are connected together by a crossbar 5. The pieces of dough are first kneaded into a circular shape within the part of the kneading cell 1 bounded by the intermediate walls 3 and 4. When the elongating kneading movements are started, the intermediate walls are withdrawn so that the piece can be brought into the desired elongated shape.

According to Figure 3 the kneading cell 6 is constructed of elastic material such as rubber or the like, to which two ears 7, 8 are attached. To each ear an actuating mechanism is connected by means of which, after starting the elongating kneading movement the ears are drawn apart so that the cell takes up an elongated oval shape as shown in Figure 4. This elongated shape can also be produced by external pressure on the walls of the cell.

In the actuating mechanism illustrated in Figures 5 and 6 for producing different giratory movements a bracket 26 is mounted on the machine framework 25 and a vertical shaft 27 is journalled in this bracket. The shaft 27 may be driven by any suitable means as, for example, by an electric motor. On the upper end of this shaft is mounted a crank disc 28 carrying a crank-pin 29 with which two connecting rods 30, 31 engage. The connecting rod 30 is connected with a double-armed lever 32 which is mounted to rock on a stud 33 on a fixed bracket 34. The other end of the double-armed lever 32 has a slot 35 in which a slide 36 is guided. This slide carries a pin 37 with which a connecting rod 38 engages. The eye 39 of the connecting rod 38 is connected with the kneading head 40 which is generally of a form well known in the art and similar, for example, to the one shown in my United States Patent No. 1,761,399. However, the cells within the working or kneading head of the present application are of the types described above and illustrated in the drawings. By means of a link 41 which is connected with the connecting rod 38 one end of this connecting rod can be displaced in the necessary manner, together with the slide in the slot 35 of the double-armed lever 32.

The connecting rod 31 engages a second double-armed lever 42 which is mounted to rock about a stud 43 carried by the fixed bracket 44, the other end of the double-armed lever 42 has likewise a slot 45 in which a slide 46 is guided, a pin 47 on which engages a connecting rod 48 which is connected by means of its eye 49 with the kneading head 40 which carries the kneading cells. By means of a link 50 one end of the connecting rod 48 is displaced together with the slide in the slot 45 of the double-armed lever 42. The links 41 and 50 could be moved by hand or also by control discs.

A simple arrangement for securing the slide 36 in any one of its positions along the slot 35 is shown in Figure 6. A bracket 68 is attached to the frame 25 and is provided with a longitudinal slot 69. Mounted to slide along the slot is a spindle 70. The end of the link 41 is mounted to pivot on the spindle. A nut is used to secure the spindle in any one of its positions along the slot. Like means are provided for the link 50 for adjustably securing the slide 46 in any one of its positions along the slot 45 without interferring with the pivotal movement of the link 50 due to the rocking of the double-armed lever 42. The means shown are only by way of example and other means for accomplishing the same result would readily suggest themselves to the ordinary mechanic.

The method of operation of the mechanism is as follows. If the crank disc 28 with the crank-pin 29 are rotated by means of the shaft 27 the connecting rods 30, 31 move the double-armed lever 32, 42 at the one end to and fro, the other end of the levers 32, 42 thus continuously execute the same rocking movements. If now the connecting rods 38 and 48 are in the position shown they exert on the kneading head 40 a uniform pushing motion and move the kneading head in a circle. By this means a regular circular kneading movement is produced.

If now it is desired to bring the kneading head to rest the slides 36, 46 are moved in their guiding slots to the centres of the pins 33 and 43 by means of the links 41 and 50. In this case the driving apparatus can run continuously while the kneading head itself remains stationary.

If it is desired to execute oval movements, this is obtained without further difficulty if one of the two slides 36, 46 is moved further outwards than the other. If it is desired to carry out a to and fro kneading movement only, one slide is pushed outwards, or if both are outwards, one is moved inwards.

With this apparatus one is in the position without further difficulty of starting with any kind of kneading movement of small amplitude, increasing it continuously and finally again decreasing the kneading stroke in the necessary manner until the zero point is again reached. If the sliding blocks are moved quickly corresponding rapid changes in the magnitude and the shape of the kneading movements occur.

Figure 6 shows only one form of construction. In order to produce the same movements other driving mechanisms could equally well be employed. For example the same result is attained if instead of the one crank disc 28 two crank discs are provided, and one of the connecting rods 30, 31 is connected to each individually. If now these crank discs are uniformly rotated then the same movements are also obtained as in Figure 6.

Figure 5 also shows the use of a cell, such as illustrated in Figures 3 and 4, with the mechanism described above. The cell 6 of flexible material is placed on the work table. The end brackets 7 and 8 are engaged by brackets 71 and 72 which are slidably and adjustably connected to the member 40. As the walls of the cell are flexible, its shape may be changed manually. The nuts 73 are used to secure the cell in any one of a number of different shapes. Various other means for securing adjustment of the shape could readily be provided by the ordinary mechanic. So also with the cells shown in Figures 1, 2, and 7 to 10, the change of shape may be accomplished manually or by simple mechanical means.

Figure 7 shows a construction of a kneading cell by which it is possible to remove partly or wholly the pressure exerted from above on the pieces of dough during the longitudinal kneading. The upper pressure plate 2 is actuated by a bolt 51 surrounded by two springs 52, 53 and having at its upper end an adjusting screw 54. Between the inside ends at the coil springs 52, 53 is arranged a lever 55 turning on a pin 56, mounted slidable on a sliding piece 57 the position of which in the slot 58 of the frame 61 is regulated by a spindle 59 by means of an adjusting screw 60. The free end of the lever 55 is connected by a pin 62 to a link 63. The variation of the pressure of the dough-pieces is now possible by adjusting one of the screws 54 or 60 or by exerting a pull on the link 63 by the kneading machine.

Figure 8 shows a cell with an upper wall, the inside 64 of which is suited to the shape of the finished kneaded piece, so that a uniform pressure is exerted on all parts of the pieces.

Figure 9 is a kneading cell in which the upper wall 64 consists of yielding material so that it can adapt itself to the shape of the dough-piece as indicated in dotted lines.

In Figure 10 is represented a kneading cell the upper wall of which consists of a number of parts 65, 66, 67, which may be individually pressed more or less deeply against the kneaded part during kneading according to the shape of the piece to be kneaded.

In the manner described, kneading free from objection is ensured. This was scarcely possible with the apparatus hitherto known. The reason for this is to be sought in the fact that during elongating kneading quite special circumstances occur. The correctly adjusted stretching of the skin of the dough during the elongating kneading movements is particularly difficult because during the to and fro movements the skin is stretched unsymmetrically but in a special manner during each displacement movement, and also the folding together of the "closings" takes place in a manner quite different from that which occurs in simple circular kneading. During the kneading the bottom edges of the walls of the cells attack the dough. A portion of the "skin" of the dough is caught between the bottom edges of the cells and the work table at a terminal. Due to this, more and more of the "skin" is caught and twisted in the terminal as the kneading progresses. This terminal is defined herein by the term "closing". The stretching of the skin in this way always takes place alternately, thus the "closings" are always formed alternately and fold into one another. In an alternating stretching of the skin the latter, however, tears substantially more easily than in circular kneading. A correct stretching and a correct treatment of the sensitive skin is ensured by the invention.

I claim:—

1. A machine for working dough, comprising a working head, a stationary plate, means for imparting gyratory motion to said working head, wherein said gyratory motion of the working head has two components at right angles to each other, means for varying one of the components and separate means independent of said last named means for varying the other component.

2. A machine for working dough comprising a working head, pivoted members, means to impart movement to the pivoted members, members connecting the working head and the pivoted members, said connecting members being substantially at right angles to each other, and means for independently varying the distance between the pivot points of each pivoted member and the points at which the respective connecting member is connected thereto.

3. A machine for working dough comprising a working head, pivoted members, means to impart movement to the pivoted members, connections between the working head and the pivoted members, and means for independently varying the distance between the pivot point and the point at which said connections attach to said pivot member.

4. A machine for working dough comprising a frame, a working head, a driven disk having a pin thereon offset from the center, a pair of double armed levers each having a longitudinal slot in one of its arms and each pivoted at the inner end of said slots on brackets extending from the frame, a pair of rods connecting the ends of the non-slotted arms of the double armed levers and said pin on the driven disk, rods slidably engaged in the slots and connecting the double armed levers to stud on the working head, said studs being offset from the center thereof and means for independently moving the rods with respect to the slots to vary the movement imparted to the working head.

5. In a machine for working dough as defined in claim 1, a working head provided with at least one working cell, said cell having a movable wall whereby the shape of the cell may be changed.

6. A machine for working dough, comprising a working head, a stationary plate, means for imparting gyratory motion to said working head, wherein said gyratory motion of the working head has two components at angles to each other, means for adjusting one of said components to a plurality of values between the maximum and minimum independently of the other component.

7. A machine for working dough, comprising a working table, a working head having at least one working compartment, means to impart relative gyratory movement to the said working head and compartment, and means to increase the working movement transversely of the compartment relatively to the movement longitudinally thereof, the walls of said compartment being movable, whereby the shape thereof may be changed to cooperate with said transverse movement for producing elongated dough pieces.

8. A machine for working dough, comprising a working head and a supporting plate one of which remains stationary, means for imparting a gyratory motion to the other, wherein said gyratory motion has two components at angles to each other, means for adjusting one of said components to a plurality of values between the maximum and minimum independently of the other component.

9. A machine for working dough, comprising a working table, a working head having at least one working compartment the walls of which are movable, means to impart relative gyratory movement to said working head and compartment, and means to increase the working movement transversely of the compartment relatively to the movement longitudinally thereof, means by which the walls of the compartment can be made to assume a position different from their position during the first motion imparted to the compartment, and to consequently exert a different pressure on the dough pieces within said compartment.

In testimony whereof I affix my signature.

OTTO KREMMLING.